United States Patent [19]

Palmer

[11] 3,711,641

[45] Jan. 16, 1973

[54] VELOCITY ADJUSTING SYSTEM

[75] Inventor: Richard Claxton Palmer, Blawenburg, N.J.

[73] Assignee: RCA Corporation

[22] Filed: March 22, 1971

[21] Appl. No.: 126,797

[52] U.S. Cl. . 178/6.6 TC, 178/6.6 DD, 179/100.2 K, 340/174.1 B

[51] Int. Cl. ........G11b 3/10, G11b 25/04, H04n 5/76

[58] Field of Search ........178/6.6 A, 6.6 DD, 6.6 TC, 178/6.6 P; 179/100.2 K; 340/174.1 A, 174.1 B

[56] References Cited

UNITED STATES PATENTS

| | | | |
|---|---|---|---|
| 2,892,022 | 6/1959 | Houghton | 340/174.1 A |
| 3,530,258 | 9/1970 | Gregg | 178/6.6 TC |
| 2,972,660 | 2/1961 | Toulon | 178/6.6 A |
| 3,325,603 | 6/1967 | Rabinow | 179/100.41 |

*Primary Examiner*—Howard W. Britton
*Attorney*—E. M. Whitacre

[57] ABSTRACT

Circuit means are provided for detecting velocity errors in the rotational speed of a turntable employed to rotate a video disc. The circuit means provide a corrective error signal which is processed and applied to an electro-mechanical transducer to which the pickup arm is mounted. The transducer imparts a corrective longitudinal motion to the pickup arm to maintain the relative velocity between the pickup stylus and the groove at a predetermined value.

16 Claims, 2 Drawing Figures

Figure 1:
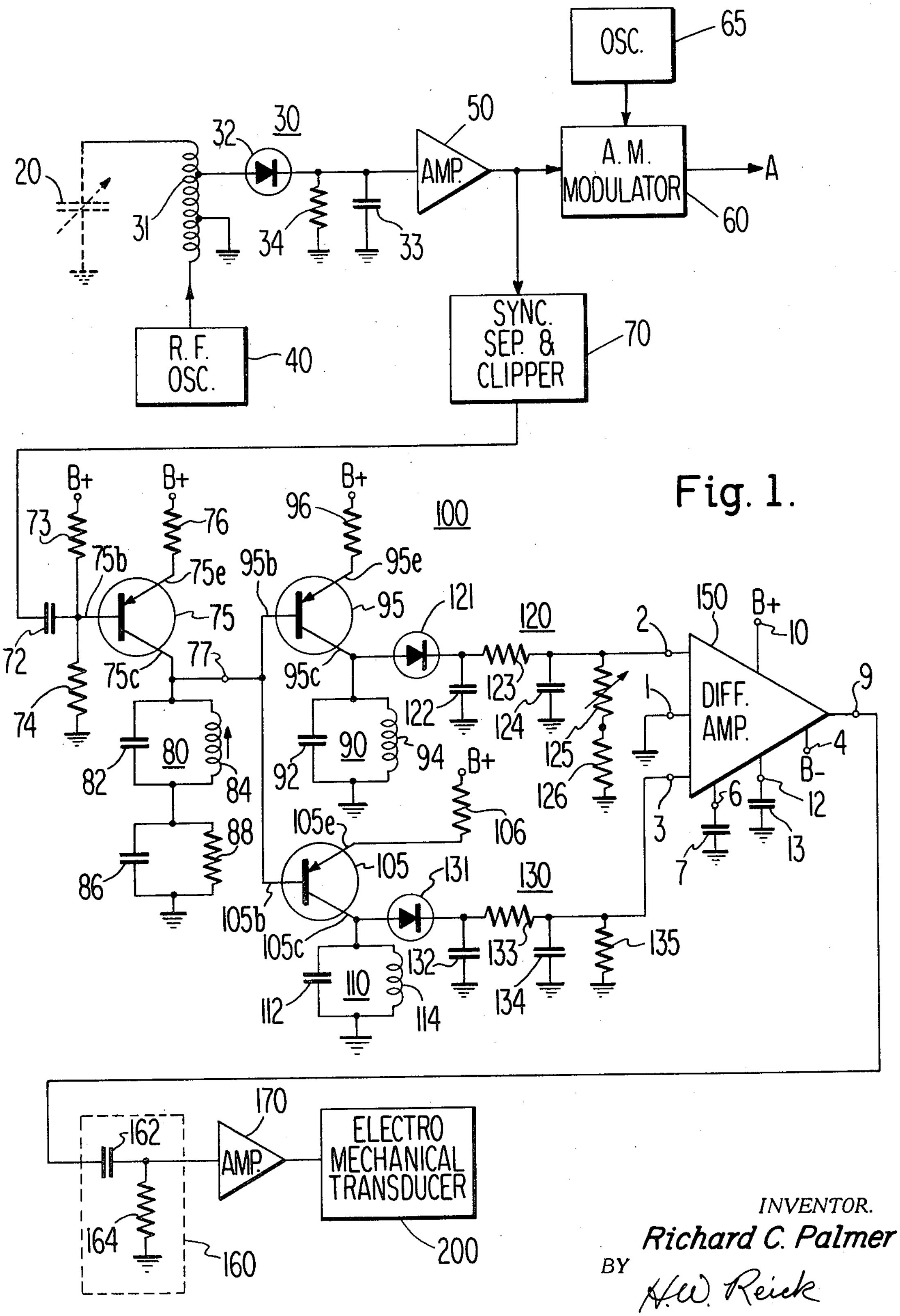

INVENTOR.
Richard C. Palmer
BY
H.W. Reick
ATTORNEY

INVENTOR.
Richard C. Palmer
BY H.W. Reick
ATTORNEY

VELOCITY ADJUSTING SYSTEM

The present invention relates to a system for maintaining the relative velocity between a pickup stylus and a signal groove of a video disc substantially constant at a given radius.

When video signals are recorded on a disc and replayed using a substantially constant speed turntable and pickup assembly similar to a phonograph player mechanism, it is necessary to maintain the rotational velocity of the disc relatively constant to prevent "jitter" of the displayed television picture which results when velocity deviations greater than 0.01 per cent occur and a conventional television receiver is employed to display the video signal. In addition to picture jitter, if color television signals are being played back, small velocity variations will noticeably deteriorate the quality of the color display.

Velocity errors result from several sources. For example: disc mounting eccentricities, disc warp, disc pressing distortions, recording errors, turntable eccentricities or turntable drive motor shaft and idler assembly eccentricities, or vibrations. Although precise mechanical design and manufacture of the disc and turntable mechanism minimize the velocity errors due to these sources, residual velocity errors sufficient to deteriorate the picture quality will remain.

In audio frequency playback systems, the turntable speed is relatively slow and the signal frequency is low compared to video frequency signals. Thus, speed variations (wow and flutter) present in audio playback systems can be adequately reduced by the design of the turntable mechanism and residual velocity errors of 0.5 per cent or less are unnoticeable. With video frequency recording, however, a very small velocity error (i.e., 0.01 per cent) will noticeably effect picture quality. A turntable cannot be economically designed for mass consumer use which will provide sufficient rotational speed accuracy to prevent distortion in the reproduced image from a video record. In addition, the video disc itself cannot inexpensively be manufactured to the tolerances necessary to prevent velocity errors between the disc and the pickup stylus which are of a sufficient magnitude to cause picture jitter and color phase distortion of the reproduced television display even if the turntable speed was held constant.

The frequency of the velocity errors which cause picture jitter lie in a range from a very low frequency (such as 6Hz) to approximately 1KHz. In prior recording systems, the speed of the drive mechanism used to impart motion to the record format (i.e., tape or disc, etc.) has been controlled using a closed loop motor speed control system. When, however, video signals are to be reproduced where relatively high frequency velocity errors cause picture distortion, the inertia of the mechanical drive means prevents the drive motor from responding to high frequency correction signals and different correction means must be used.

The velocity correction system of the present invention is a closed loop feedback system which provides an inexpensive means to vary the position of the pickup means relative to the moving recording medium in a manner to maintain the relative velocity between the two substantially constant for a given radius from the center of rotation thus correcting for residual velocity errors. In one embodiment using such a correction system, a synchronous motor (360 r.p.m.) with no additional motor speed control means provided the necessary rotational motion to a video disc used as the recording medium.

Systems embodying the present invention include detection means for detecting the velocity of the recording medium relative to a pickup means. Circuit means are coupled to the detection means and develop an error signal when the detected velocity differs from the desired velocity. Electro-mechanical transducing means are mechanically coupled to the signal pickup means and electrically coupled to the circuit means. The transducing means is responsive to the error signals from the circuit means to vary the position of the signal pickup means in a manner to maintain the relative velocity between the pickup means and the recording medium at the required velocity.

Figure 2:
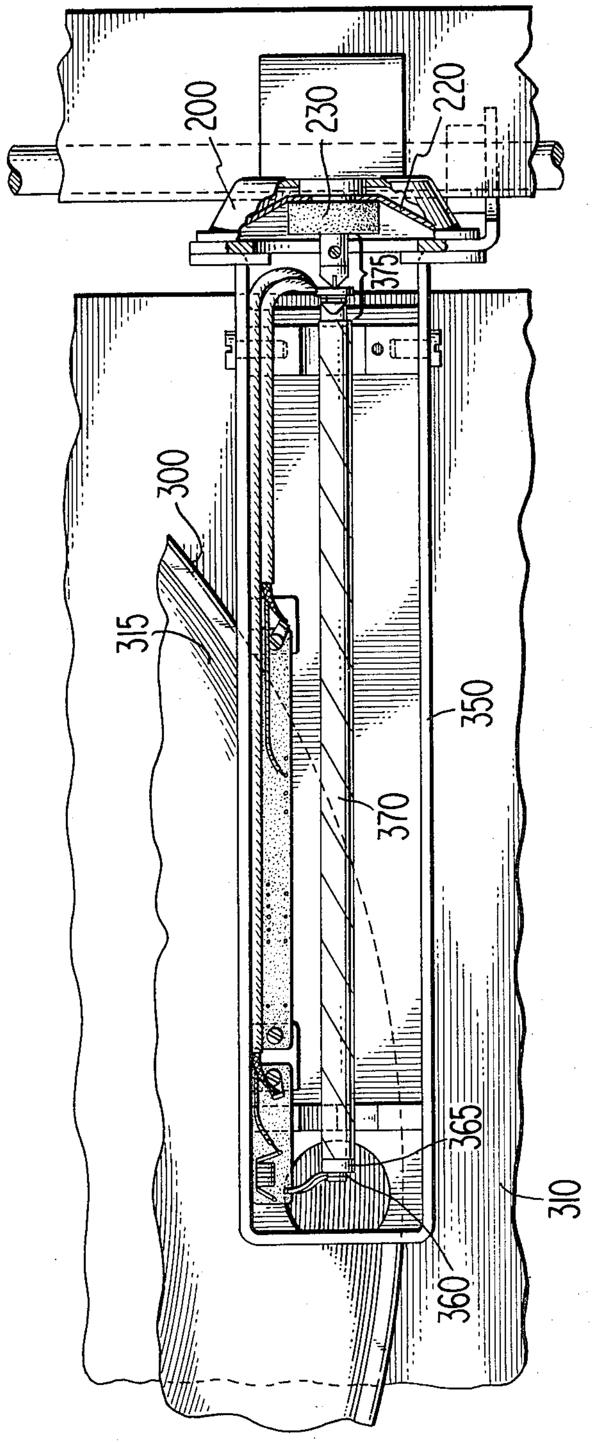

The present invention can best be understood by referring to the accompanying figures and descriptions thereof in which:

FIG. 1 is a schematic diagram partially in block diagram form of the electrical circuits in one embodiment of the present invention; and FIG. 2 is a top view of a turntable and pickup arm assembly embodying the present invention.

In FIG. 1 there is shown a signal source 20 which is shown as a variable capacitor. The capacitor 20 varies with recorded information on the video disc 300 shown in FIG. 2 as described in a U.S. Pat. Application Ser. No. 126,772, filed Mar. 22, 1971, for Jon K. Clemens, entitled "Information Records and Recording/Playback Systems Therefor" also assigned to the present assignee. A brief description of the pickup circuitry is, however, included here. The capacitance variations of the variable capacitor 20 (shown in dashed lines to indicate the capacitance is variable due to signal information change) vary the resonant frequency of the tuned circuit of detector circuit 30 which includes the inductance of the inductor 31, the junction capacitance of diode 32 and the stray capacitance of the circuit. Radio frequency energy is injected into the tuned circuit by means of an R.F. oscillator 40. As the resonant frequency of the tuned circuit varies in accordance with the recorded signals, the response of the tuned circuit to the fixed frequency R.F. signal from oscillator 40 varies and the peak detector circuit comprising diode 32, capacitor 33 and resistor 34 detects the resultant amplitude variations which are representative of the recorded composite television signals. Thus, the input signal to amplifier 50 will comprise composite television signals consisting of luminance, chrominance and synchronization information.

Amplifier 50 amplifies the composite signals which are then applied to AM modulator circuit 60. An oscillator 65 tuned to one of the UHF or VHF channels of the television broadcast system provides a carrier signal which is applied to the modulator 60. The carrier is modulated by the incoming composite television signals and the resultant amplitude modulated carrier at output terminal A can be applied to the input terminals of a television receiver to display the recorded video information. The video frequency signals from amplifier 50 are also applied to a sync separator and clipper stage 70. Stage 70 is a horizontal sync separator circuit which is employed to separate the horizontal sync signal components from the composite television signals. Stage 70 also includes an amplitude limiter (i.e., clipper) circuit so that the output horizontal sync signals are of a fixed amplitude.

When the disc is rotated at exactly the proper speed (for example, 360 r.p.m. in one embodiment), the frequency of the detected horizontal sync pulses will be exactly the desired horizontal sync frequency of 15.734KHz. Thus, if the turntable shown in FIG. 2 has a rotational speed somewhat slower or faster than the proper playback speed or if disc eccentricities are present, the detected sync pulse frequency will be lower or higher respectively than 15.734KHz. Either the rotational speed of the turntable, record eccentricities or recording errors will cause the detected sync pulse frequency to deviate from 15.734KHz. This frequency change can be detected and an error voltage developed by means of a frequency discriminator circuit 100 shown in FIG. 1.

The detected sync pulses from stage 70 are applied to an input transistor 75 of stage 100 by means of a coupling capacitor 72. Bias for transistor 75 is established by means of resistors 73 and 74 coupled from a source of power (B+) to a reference potential such as ground. A base terminal **75*b* of transistor 75 is coupled to the junction of resistors 73 and 74. An emitter resistor 76 is coupled from an emitter terminal 75*e* of transistor 75 to B+. A parallel resonant circuit 80 and a bias circuit comprising a capacitor 86 and a resistor 88 are coupled from a collector terminal 75*c* of transistor 75 to ground. Resonant circuit 80 is tuned to the horizontal sync pulse frequency (15.734KHz) and comprises a capacitor and an inductor 84 which may be adjustable to set the exact frequency. Resonant circuit 80 is employed to convert the horizontal sync pulses which appear as relatively narrow (5 microseconds) pulses at the base of transistor 75 into sinusoidal signals at the collector of transistor 75. The signals present at terminal 77 which is coupled to collector terminal 75c of transistor 75 will follow the detected sync pulse frequency and the amplitude will vary symmetrically about the center frequency (15.734KHz) since the tuned circuit 80** has a relatively broad response curve.

The signals at terminal 77 are then applied to KHZ, and upper frequency detection circuit 120 and to a lower frequency detection circuit 130 by means of buffer amplifiers including transistors 95 and 105 respectively. Terminal 77 is coupled to a base terminal **95*b* of transistor 95 and to a base terminal 105*b* of transistor 105. An emitter terminal 95*e* of transistor 95 is coupled to a B+ by means of an emitter resistor 96. An emitter terminal 105*e* of transistor 105 is coupled to B+ by means of an emitter resistor 106. A resonant circuit 90 comprising a capacitor 92 and an inductor 94 whose values are selected such that circuit 90 will resonate at approximately 16.7KHz is coupled between a collector terminal 95*c* of transistor 95 and ground. This resonant circuit 90 will develop higher amplitude signals across it when the detected sync pulse frequency is above the means frequency of 15.734KHZ,and lower amplitude signals when the sync pulse frequency is below the mean frequency. A lower frequency resonant circuit 110 comprising a capacitor 112 and an inductor 114 is tuned to approximately 14.7KHz and is coupled between a collector terminal 105*c* of transistor 105 and ground. The amplitude of the signals developed across resonant circuit 110** will be greater when the detected sync pulse frequency is lower than the mean frequency (15.734KHz).

A detector circuit 120 comprising a diode 121 and filter components 122, 123, 124, 125 and 126 develops a direct voltage signal having an amplitude which is variable in response to the shifting frequency of the signals at terminal 77. A second detector circuit 130 is coupled across the resonant circuit 110 and comprises a diode 131 and filter components 132, 133, 134 and 135. Detector and filter circuit 130 provides a varying DC voltage of opposite sense than circuit 120 in response to frequency deviations of the detected sync pulse frequency. Thus, the two tuned circuits 90 and 110 and their associated detector circuits 120 and 130 respectively will provide two varying direct voltage error signals across the output resistors 125 and 126 of detector circuit 120 and resistor 135 of detector circuit 130. When the detected sync pulse frequency equals the means frequency, resistor 125 is adjusted such that these DC voltages are equal. When the detected sync pulse frequency is higher than the mean frequency, the upper frequency resonant circuit 90 produces a greater amplitude output signal while the lower frequency resonant circuit 110 produces a lower amplitude output signal. Thus the output of detector 120 will, when the detected sync pulse frequency is high, produce a greater amplitude DC control voltage than peak detector circuit 130. When the detected sync pulse frequency is lower than the mean frequency, the opposite effect takes place, that is, the amplitude of the output signal from detector 130 will exceed the output signal from detector circuit 120. These two output signals from detector circuits 120 and 130 are applied to differential inputs of a differential operational amplifier 150.

The output of detector circuit 120 is coupled to an input terminal 2 of amplifier 150 and the output signal from detector circuit 130 is coupled to an input terminal 3 of amplifier 150. A terminal 1 of amplifier 150 is coupled to ground and terminals 6 and 12 of amplifier 150 are coupled to ground by means of capacitors 7 and 13 respectively. A terminal 10 of amplifier 150 is coupled to the B+ supply voltage while a terminal 4 of amplifier 150 is coupled to a B− supply voltage which has the same voltage amplitude of the B+ supply but has a reverse polarity. An output terminal 9 of amplifier 150 provides the correction signal which is then employed to drive the electro-mechanical transducer 200. The differentially coupled operational amplifier 150 can be fabricated from an RCA integrated circuit type CA3015. When so fabricated, the terminal numbers shown in FIG. 1 correspond to terminals on the integrated circuit as described in an RCA application note ICAN–5213 published by RCA Corporation, Electronic Components and Devices, Harrison, New Jersey in 1966.

The polarity of the correction signal at output terminal 9 will change as the frequency of the detected sync pulses cross the mean frequency. The amplitude of the correction signals varies as a function of the magnitude of the frequency difference between the detected sync pulse frequency and the mean frequency, and the frequency of the control signal at terminal 9 varies as the rate of change of the frequency of the detected sync pulse frequency with respect to the mean frequency. This correction signal is then applied to a high pass filter 160 which is utilized to pass frequencies above 6Hz and substantially attenuate frequencies below 6Hz. Filter 160 may comprise a coupling capacitor 162 and a resistor 164 coupled from the coupling capacitor 162 to ground as shown in the figure. The output signal from filter 160 is applied to a power amplifier 170 which amplifies the correction signal which is then applied to a suitable electro-mechanical transducer 200.

Filter 160 determines the low frequency cut off point of the response of the system while the filter components in the peak detector circuit 130 provided the high frequency cut off point of the response of the system to detected sync pulses frequency variations. In the embodiment shown, the upper frequency point was 100Hz but in some applications it may be necessary to adjust the parameters for a greater frequency range. The travel of the electro-mechanical transducer necessary to correct for velocity errors of a given magnitude is inversely related to the frequency of the error component. Since the total excursion of the transducer is limited, a low frequency cut off point must be selected. A frequency of 6Hz was chosen since this frequency corresponds to the once-around turntable speed where the turntable speed is 360 r.p.m. below which no significant velocity error exists.

Referring to FIG. 2, there is shown a portion of a video disc 300 which is resting on a turntable mounted in a turntable mounting board 310. The pickup arm 350 is placed so that a stylus 360 is riding in a groove 315 of disc 300. The stylus 360 is mounted to a stylus arm 370 by means of a stylus mounting cap 365. The stylus arm 370 is coupled to an electro-mechanical transducer 200 by means of a flexible pivot assembly 375. The details of this assembly are described in a concurrently filed application entitled "Stylus Arm Pivot" by Marvin A. Leedom, Ser. No. 126,677, filed Mar. 22, 1971, which is assigned to the present assignee. The flexible pivot assembly 375 allows for horizontal and vertical motion of the stylus 360 while providing longitudinal strength (i.e., in the direction of the length of the stylus arm 360) for the necessary mechanical coupling between the stylus arm 370 and the electro-mechanical transducer 200. The transducer 200 shown is a permanent magnet type loudspeaker having a diameter in one embodiment of 1½ inches. Assembly 375 is mounted to a speaker cone 220 by means of a mounting block 230 which is bonded to the speaker cone using a suitable bonding agent such as epoxy. The speaker employed as transducer 200 was modified to prevent mechanical resonance in the frequency control range of the corrector system by damping the voice coil of the speaker using a commercially available silicone grease such as Dow-Corning No. 4. The grease serves the dual purpose of conducting generated heat away from the voice coil. The speaker as modified responds in a relatively linear manner between the 6 to 100Hz frequency range and provides a 0.02 to 0.04 inch longitudinal correction motion in response to the correction signal from the power amplifier 170 in FIG. 1. Although a permanent magnet speaker can be successfully used, other transducers can be employed.

Since the turntable rotational speed is substantially constant in one embodiment, the velocity of the groove relative to the pickup stylus constantly changes as the stylus moves along the helical groove toward the center of the disc. The recorded sync pulses are variably spaced along the groove such that for any given radius on the disc, the frequency of the detected sync pulses will be 15.734KHz unless a velocity error exists indicating that for that radius the velocity of the groove relative to the stylus is improper. The velocity correction system described herein will provide a correction motion to the stylus to insure the relative velocity between the groove and the stylus is the required velocity for the radius of the groove being played. It is possible, however, to employ a turntable having a variable speed such that the velocity of the groove relative to the stylus is held constant. The present velocity correction system can likewise be employed with such a turntable to maintain the relative velocity constant.

It is noted that the horizontal sync pulses which are recorded on the video disc serve as a convenient frequency reference from which to develop a control signal which is used to correct velocity errors. Other systems, however, could employ separate recorded frequency for accomplishing the same purpose.

If variations of the rotation speed of a constant speed turntable alone are to be compensated for, this can be accomplished by employing optical detection means in conjunction with a permanent reflecting pattern on the turntable itself to develop the requisite pulses whose frequency will vary with turntable speed variations. These signals could then be processed and employed to maintain the relative velocity between the stylus and the turntable constant at a given radius using circuitry and mechanical structure similar to that described in the present application.

What is claimed is:

1. A velocity adjusting system for maintaining a predetermined relative velocity between a record medium and a tracking stylus, comprising:

means for moving said record medium at a predetermined velocity, said record medium having a groove with information recorded therein, said tracking stylus positioned in said record medium groove for detecting signals recorded on said record medium, means for developing a correction signal when the velocity of said record medium relative to said tracking stylus deviates from said predetermined relative velocity, and electro-mechanical transducer means coupled to said tracking stylus to vary the physical position of said tracking stylus with respect to said record medium groove to correct for deviations of said velocity from said predetermined relative velocity.

2. A system as defined in claim 1 wherein said record medium comprises a disc having a helical groove.

3. A system as defined in claim 1 wherein said electro-mechanical transducer means comprises a permanent magnet loudspeaker having a voice coil coupled to said electrical circuit means and having a speaker cone mechanically coupled to said tracking stylus.

4. A system as defined in claim 1 wherein said means for developing a correction signal processes signals recorded in said medium and detected by said tracking stylus, said detected signals, when said record medium is moving at a predetermined velocity relative to said tracking stylus, appearing as constant frequency signals of a predetermined frequency.

5. A system as defined in claim 4 wherein said means for developing a correction signal further comprises circuit means comprising a discriminator circuit for providing a correction signal in response to said electrical signals from said tracking stylus when said relative velocity between said record medium and said tracking stylus deviates from a predetermined relative velocity.

6. A speed correction system for correcting for undesirable speed variations between a record medium and pickup means, said system comprising:

electrical circuit means for detecting the speed of said record medium and for developing an error signal when said detected speed differs from a predetermined speed;

electro-mechanical transducer means coupled to said electrical circuit means and mechanically coupled to said pickup means to vary the physical position of said pickup means; and said pickup means including a pickup stylus adapted to track in a groove in said record medium, and further adapted to detect signals recorded in said groove such that when the relative speed between said pickup stylus and said groove is at a predetermined level, said detected signals are of a predetermined frequency.

7. A system as defined in claim 6 wherein said record medium is a disc having a helical groove therein.

8. A system as defined in claim 6 wherein said detected signals recorded in said groove comprises horizontal synchronization signals recorded in conjunction with recorded composite television signals.

9. A system as defined in claim 6 wherein said electrical circuit means comprises a frequency discriminator circuit coupled to said pickup means and responsive to variations in the frequency of signals detected thereby to provide an error signal when the speed of the record medium relative to the pickup means differs from said predetermined speed.

10. A system as defined in claim 6 wherein said electro-mechanical transducer means comprises an electromagnetic transducer.

11. A system as defined in claim 10 wherein said electromagnetic transducer comprises:

a permanent magnet, an electrical winding movably mounted adjacent said permanent magnet such that as electrical current is passed through said winding motion is imparted to said winding, and mechanical means for coupling said movable winding to said pickup means.

12. In a disc recording system employing a pickup arm and pickup stylus assembly engaging a groove in a disc record for detecting information recorded in the groove of said disc, and wherein a fixed frequency reference signal is recorded in the groove of said disc, a velocity adjusting system for correcting for velocity errors between said pickup stylus and said groove comprising:

circuit means for detecting said reference signals and for converting frequency deviations of said reference signal due to velocity errors into an error signal, and electro-mechanical transducer means coupled to said electrical circuit means and mechanically coupled to said pickup stylus, said transducer means responsive to said error signal from said circuit means to vary the position of said pickup stylus with respect to the groove in said disc in a manner to correct for velocity errors between said pickup stylus and said groove.

13. A system as defined in claim 12 wherein said electrical circuit means includes a frequency discriminator circuit for converting frequency deviations of said reference signal into said error signal.

14. A system as defined in claim 12 wherein said disc recording system is employed to record composite television signals and wherein said fixed frequency reference signals are horizontal synchronization signals included in said composite television signal.

15. A system as defined in claim 12 wherein said electro-mechanical transducer means comprises an electromagnetic transducer.

16. An electromagnetic transducer as defined in claim 15 comprising:

a permanent magnet, an electrical winding movably mounted adjacent said permanent such that as electrical current is passed through said winding motion is imparted to said winding, and mechanical means for coupling said movable winding to said pickup stylus.

* * * * *